US011119629B2

(12) United States Patent
Shaw et al.

(10) Patent No.: US 11,119,629 B2
(45) Date of Patent: *Sep. 14, 2021

(54) AUTOSAVE AND MANUAL SAVE MODES FOR SOFTWARE APPLICATIONS

(71) Applicant: MICROSOFT TECHNOLOGY LICENSING, LLC, Redmond, WA (US)

(72) Inventors: Han-yi Shaw, Redmond, WA (US); Ying Huang, Bellevue, WA (US); Sukhmeet Singh Toor, San Jose, CA (US); Keith B. Chellis, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/034,675

(22) Filed: Jul. 13, 2018

(65) Prior Publication Data

US 2018/0321801 A1    Nov. 8, 2018

Related U.S. Application Data

(63) Continuation of application No. 13/756,885, filed on Feb. 1, 2013, now Pat. No. 10,055,091.

(51) Int. Cl.
*G06F 11/14* (2006.01)
*G06F 3/0482* (2013.01)
(Continued)

(52) U.S. Cl.
CPC ........ *G06F 3/0482* (2013.01); *G06F 3/04847* (2013.01); *G06F 11/1458* (2013.01);
(Continued)

(58) Field of Classification Search
CPC ............ G06F 17/30115; G06F 1/3203; G06F 11/1461; G06F 11/1458; G06F 11/1451; G06F 11/1456; G06F 11/1469
See application file for complete search history.

(56) References Cited

U.S. PATENT DOCUMENTS 7,882,072 B1    2/2011  Axe et al.
10,055,091 B2    8/2018  Shaw
(Continued)

FOREIGN PATENT DOCUMENTS

CN    102799366 A    11/2012

OTHER PUBLICATIONS

"Second Office Action Issued in Chinese Patent Application No. 201480007058.7", dated Jul. 3, 2018, 5 Pages.
(Continued)

*Primary Examiner* — Rinna Yi
(74) *Attorney, Agent, or Firm* — NovoTechIP International PLLC

(57) ABSTRACT

Autosave and manual save modes in an application user interface on a computing device are provided. The computing device may be utilized to display a menu for receiving a selection of a menu option from the application user interface. The application user interface may display an electronic document to be saved. The menu option may include an option for switching between an autosave mode and a manual save mode for saving the electronic document. A selection of the menu option may then be received by the computing device. The computing device may then be utilized to activate one or more unique features associated with either the autosave mode or the manual save mode, based on the selected menu option, from the application user interface.

20 Claims, 10 Drawing Sheets

(51) Int. Cl.
*G06F 16/16* (2019.01)
*G06F 3/0484* (2013.01)
*G06F 40/174* (2020.01)
*G06F 40/197* (2020.01)

(52) U.S. Cl.
CPC .......... *G06F 16/16* (2019.01); *G06F 11/1469* (2013.01); *G06F 40/174* (2020.01); *G06F 40/197* (2020.01)

(56) References Cited

U.S. PATENT DOCUMENTS

| | | |
|---|---|---|
| 2005/0246642 A1 | 11/2005 | Valderas |
| 2008/0126442 A1 | 5/2008 | Cisler et al. |
| 2010/0070475 A1 | 3/2010 | Chen |
| 2010/0293080 A1 | 11/2010 | Shah |
| 2013/0013875 A1 | 1/2013 | Brown |

OTHER PUBLICATIONS

"Third Office Action Issued in Chinese Patent Application No. 201480007058.7", dated Sep. 30, 2018, 5 Pages.
"ForeverSave Version 1.1.3", Published on: Jan. 1, 2009, Available at: http://tool-forcesw.com/docs/ForeverSave_Manual.pdf, 16 pgs.
"International Search Report & Written Opinion for PCT Application No. PCT/US2014/013466", dated May 9, 2014, Filed Date: Jan. 29, 2014, 18 Pages.
Agarwal, Sandeep, "How to Auto Save MS Office Documents to SkyDrive aka MS Office Web Apps", Published on: Jun. 27, 2012, Available at: http://www.guidingtech.com/12559/auto-save-ms-office-documents-skydrive-web-apps/, 9 pages.
Barnhill, Suzanne S., "How Can I Make Word Save or Back Up My Document Automatically?", Published on: Mar. 28, 2004, Available at: http://word.mvps.org/faqs/general/automaticsave.hlm, 4 pages.
Bennett, "ForeverSave: Never Lose Your Work Again" retrieved from the Internet: <URL: http://mac.appstorm.net/reviews/foreversave-never-lose-your-work-again/>, 7 pages, Dec. 9, 2009.
Brannan, "Use ForeverSave: Never Lose a Mac Document Again" retrieved from the Internet: <URL: http://mac360.com/2010/02/use_foreversave_and_never_lose_a_mac_document_again/>, 7 pages, Feb. 25, 2010.
Core Technologies Overview, "OS X Mountain Lion", Published on: Jun. 2012, Available at: http://movies.apple.com/media/us/osx/2012/docs/OSX_MountainLion_Core_ Technologies_Overview.pdf, 33 pages.
First Office Action in Chinese Application No. 201480007058.7, dated Oct. 11, 2017, 32 pages.
Interactive Brokers, "TWS Notes for 888", Published on: 2008, Available at: http://www.interactivebrokers.com/en/software/releaseNotes/TWS_Notes_888.php, 4 pages.
International Preliminary Report on Patentability in International Application PCT /US2014/013466, dated Apr. 23, 2015, 18 pgs.
Knowlton, Gray, "Office and SkyDrive for Windows", Published on: Jul. 30, 2012, Available at: http://blogs.office.com/b/office-nexl/archive/2012/07 /30/office-and-skydrive-for-windows.aspx, 5 pages.
Nano Equipment Pie Lid, "SMS2Google User Guide", Published on: Mar. 2010, Available at: http://sms2google.8slreams.com/SMS2Google_v1 .pdf, 8 pages.
Office Action Issued in European Patent Application No. 14706159.2, Mailed Dale: Feb. 7, 2017, 11 Pages.
PCT Written Opinion in International Application PCT /US2014/013466, dated Dec. 22, 2014, 17 pgs.
Scoroncocolo, "Microsoft Office Web Apps Versus Google Docs", Published on: Dec. 18, 2010, Available at: http://www.scoroncocolo.com/microsoft-office-web-apps-vs-google-docs.html, 6 pages.
Thurrott, "Windows 7 Feature Focus: Backup and Restore" retrieved from the Internet: <URL: http://winsupersite.com/windows-7/windows-7-feature-focus-backup-and-restore>, 15 pages, Oct. 6, 2010.
Turn Off Auto-Save in OS X Mountain Lion (published on Aug. 28, 2012) https ://web. arch ive.org/ web/201208280901 00/http :/ /osxdaily .com/2012/08/22/tu rn-off-auto-save-os-x/.
Viticci, Federico, "Mountain Lion: The MacStories Review", Published on: Jul. 25, 2012, Available at: http://www.macstories.net/madmountain-lion-the-macstories-review/#autosave, 63 pages.
Website Pros, "Ne!Objects Fusion 9.0", Published on: Nov. 24, 2005, Available at: http://nelobjects.com/en/ nof/9/00/docs/GettingSlarted.pdf, 211 pages.

AUTOSAVE AND MANUAL SAVE MODES FOR SOFTWARE APPLICATIONS

CROSS-REFERENCE TO RELATED APPLICATIONS

This application is a continuation of U.S. patent application Ser. No. 13/756,885 filed Feb. 1, 2013, entitled "AutoSave and Manual Save Modes for Software Applications," now U.S. Pat. No. 10,055,091. The disclosure of this priority application is hereby incorporated by reference in its entirety into the present application.

COPYRIGHT NOTICE

A portion of the disclosure of this patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many modern computer operating systems provide functionality which requires applications to automatically save content changes (i.e., "autosave") and resume to a previous state when the application crashes in-use or when the application is either forced to quit or "backgrounded" (e.g., due to low system memory). Some users who are accustomed to older operating systems in which application content changes are saved manually (i.e., "manual save") may find it difficult to abandon previously established workflows and use patterns which no longer apply in an autosave environment. For example, manual save users may have become accustomed to unintentionally overwritten content in a word processing document (i.e., undesired content which the users do not intend to save overwriting content which the users do intend to save) not being saved by the underlying word processing application until the user initiates a manual save. Thus, manual save users have the opportunity to recover the overwritten content prior to the document being saved thereby preventing data loss. However, in an autosave environment, this behavior could lead to data loss if the application performs an unintended save of the document prior to the user being able to recover the overwritten content. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for autosave and manual save modes in an application user interface on a computing device. The computing device may be utilized to display a menu for receiving a selection of a menu option from the application user interface. The application user interface may display an electronic document to be saved. The menu option may include an option for switching between an autosave mode and a manual save mode for saving the electronic document. A selection of the menu option may then be received by the computing device. The computing device may then be utilized to activate one or more unique features associated with either the autosave mode or the manual save mode, based on the selected menu option, from the application user interface.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for autosave and manual save modes in an application user interface on a computing device. The computing device may be utilized to display a menu (e.g., a dropdown menu) for receiving a selection of a menu option from the application user interface. The application user interface may display an electronic document to be saved. The menu option may include an option for switching between an autosave mode and a manual save mode for saving the electronic document. A selection of the menu option may then be received by the computing device. The computing device may then be utilized to activate one or more unique features associated with either the autosave mode or the manual save mode, based on the selected menu option, from the application user interface.

Figure 1:
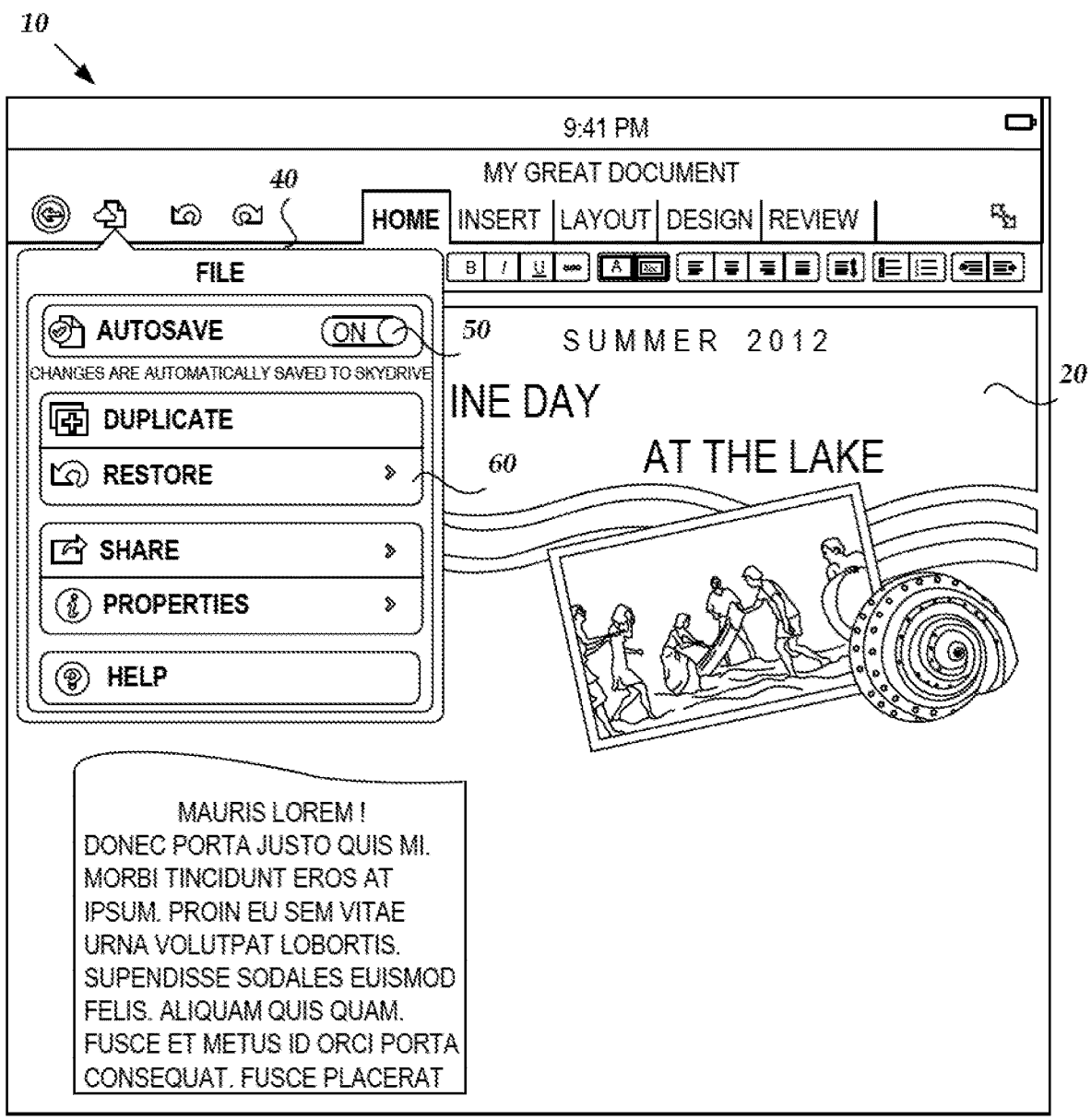
FIG. 1 is a computing device screen display of an application user interface for providing autosave and manual save modes for electronic documents, in accordance with an embodiment.

FIG. 1 is a computing device screen display of an application user interface 10 for providing autosave and manual save modes for electronic documents, in accordance with an embodiment. As will be discussed in greater detail herein, the computing device may comprise a general purpose desktop, laptop, handheld, tablet or other mobile computing device (e.g., smartphone), or other type of computer capable of executing one or more application programs. The application user interface 10 may be generated by a productivity software application (e.g., word processing software, presentation graphics software, spreadsheet software, diagramming software, project management software, publishing software, personal information management software and note-taking software) for creating, displaying and editing electronic documents, such as the electronic document 20. It should be appreciated that, in accordance with other embodiments, the application user interface 10 may also be generated by a graphics program that creates graphic files or by any other application that generates or modifies user content in the form of electric documents. The application user interface 10 may include a menu 40 (i.e., a dropdown menu) for displaying various options associated with the saving of electronic documents, including a slider control 50 for switching between an autosave mode (in which electronic documents, including changes) are automatically saved by the software application) and a manual save mode. For example, the slider control 50 may be set to "On" when the autosave mode has been selected by a user. It should be understood that the slider control 50 is merely an example of a user interface control which may be provided for selecting between autosave and manual save modes and that other types of controls may also be utilized without departing from the spirit and scope of the various embodiments described herein. The menu 40 may further include a restore option 60. In accordance with an embodiment, the restore option 60 may comprise a user interface button which, when selected, initiates the display of additional options (discussed in greater detail with respect to FIG. 3) for reverting to a last opened electronic document and reverting to a previous version of the electronic document in the application user interface 10.

Figure 2:
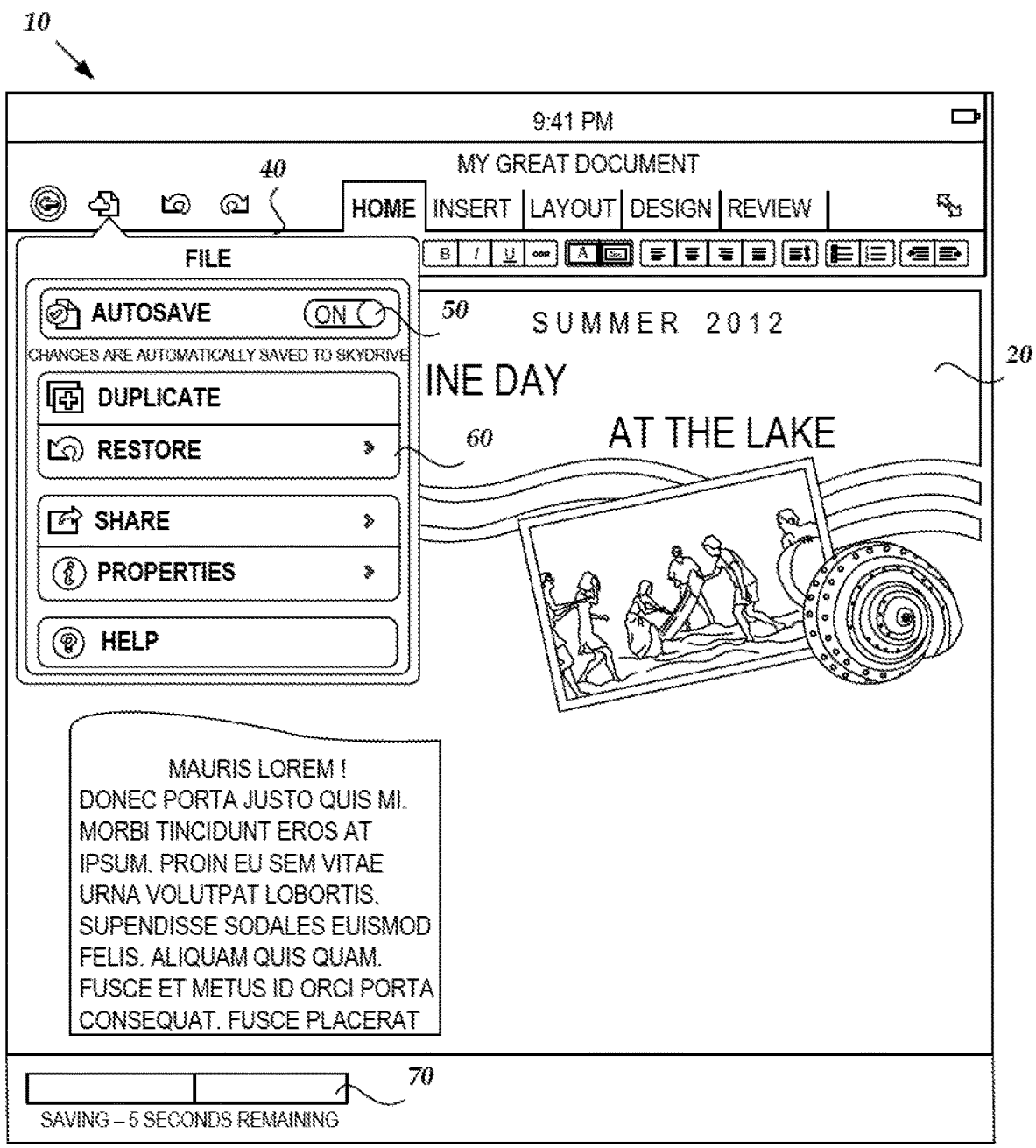
FIG. 2 is a computing device screen display of an application user interface for providing autosave and manual save modes for electronic documents, in accordance with an embodiment.

FIG. 2 is a computing device screen display of an application user interface 10 for providing autosave and manual save modes for electronic documents, in accordance with an embodiment. As discussed above with respect to FIG. 1, the application user interface 10 of FIG. 2 includes a display of the electronic document 20, the menu 40, the slider control 50 and the restore option 60. The application user interface 10 also includes a progress indicator 70 which, as will be discussed in greater detail below with respect to FIG. 6, may be displayed to show the progress of the electronic document 20 as it is being saved by a software application. It should be understood that in accordance with an embodiment, the progress indicator 70 may only be displayed for saves taking longer than a predetermined save interval (e.g., two seconds).

Figure 3:
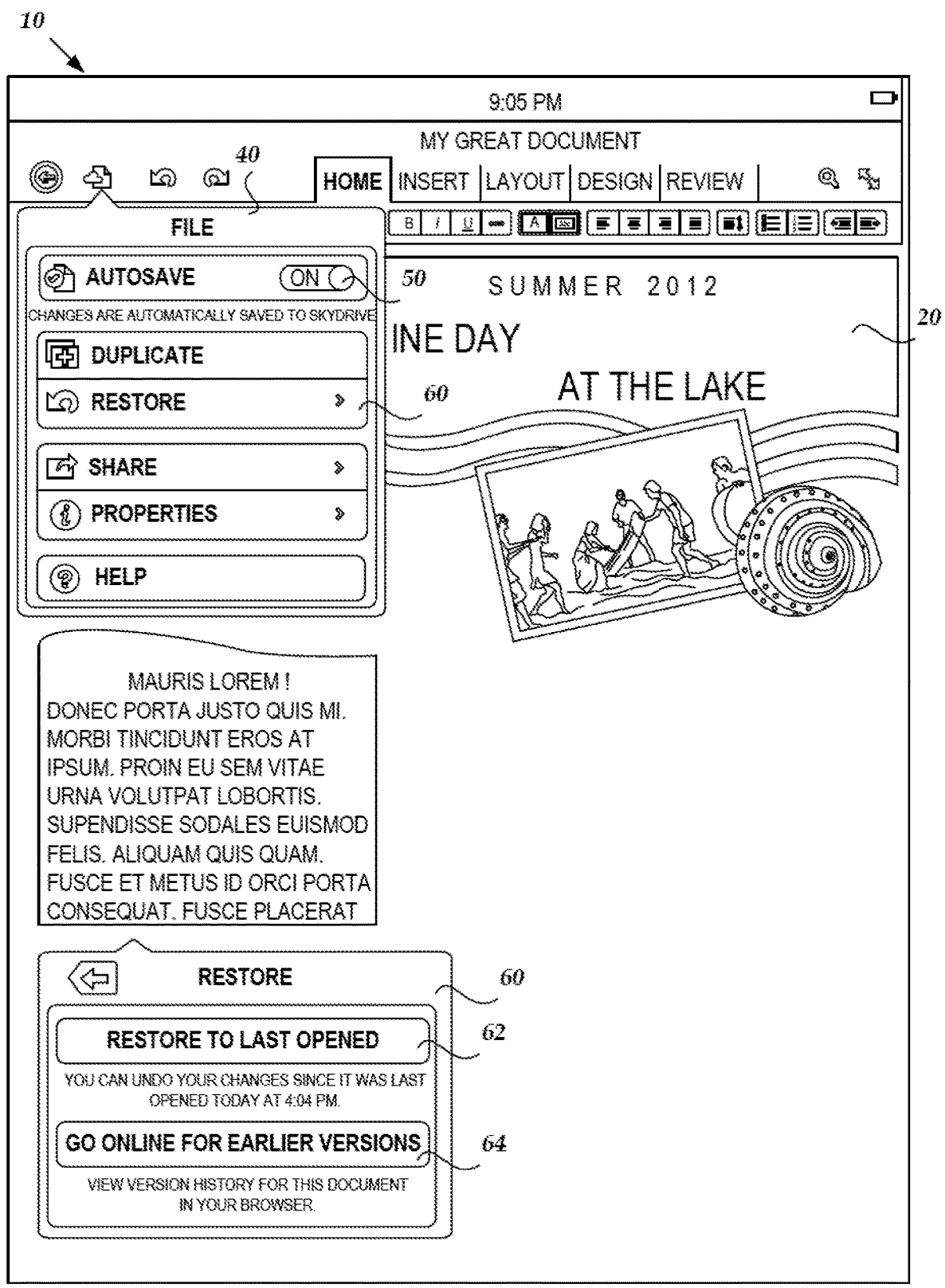
FIG. 3 is a computing device screen display of an application user interface for providing autosave and manual save modes for electronic documents, in accordance with an embodiment.

FIG. 3 is a computing device screen display of an application user interface 10 for providing autosave and manual save modes for electronic documents, in accordance with an embodiment. As discussed above with respect to FIG. 1, the application user interface 10 of FIG. 3 includes a display of the electronic document 20, the menu 40, the slider control 50 and the restore option 60. The application user interface 10 also includes the display of additional options 62 and 64 which may be generated by the selection of the restore option 60 in the menu 40. The option 62 may comprise a user interface button which, when selected, allows a user to restore to a last opened electronic document. It should be appreciated that the selection of the option 62 may enable users to undo recent changes made to the electronic document 20 since the last time the electronic document 20 was opened in the application user interface 10. The option 64 may comprise a user interface button which, when selected, allows a user to retrieve one or more earlier versions to the electronic document 20 from a data store. In accordance with an embodiment, the selection of the option 64 may allow a user to "go online" to access earlier versions of the electronic document 20 from a remote data store. In accordance with the same embodiment, the selection of the option 64 may also enable a user to view a version history of the electronic document 20 in a browser on the user's computing device.

Figure 4:
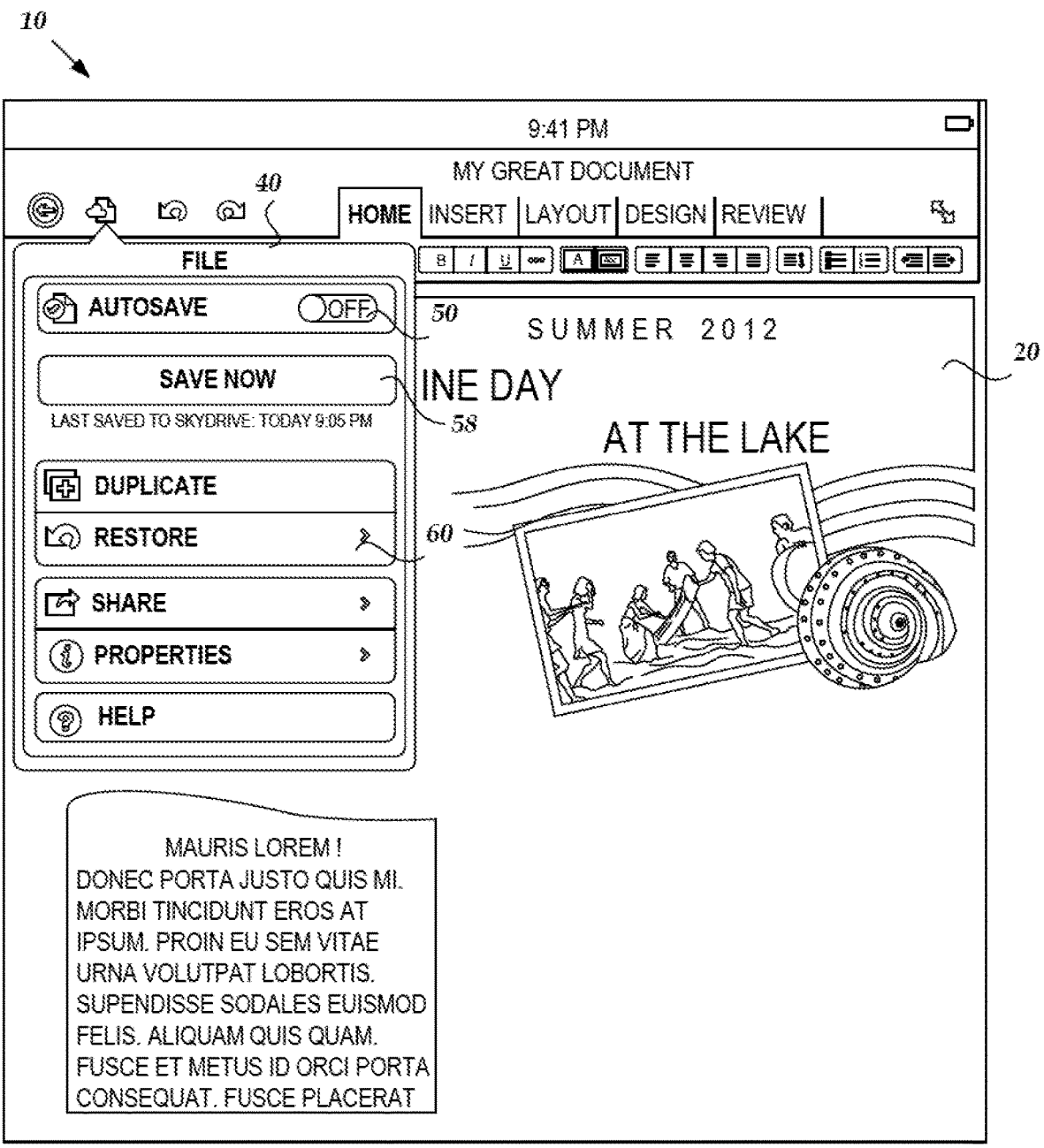
FIG. 4 is a computing device screen display of an application user interface for providing autosave and manual save modes for electronic documents, in accordance with an embodiment.

FIG. 4 is a computing device screen display of an application user interface 10 for providing autosave and manual save modes for electronic documents, in accordance with an embodiment. As discussed above with respect to FIG. 1, the application user interface 10 of FIG. 4 includes a display of the electronic document 20, the menu 40, the slider control 50 and the restore option 60. In contrast to FIG. 1 however, the slider control 50 is shown in an "Off" position thereby indicating the selection of a manual save mode for saving the electronic document 20. The application user interface 10 also displays a user interface button 58 which may be generated in response to the selection of a manual save mode utilizing the slider control 50. It should be appreciated that the user interface button 58 may be selected to initiate manual saves of the electronic document 20 at user-specified intervals.

Figure 5:
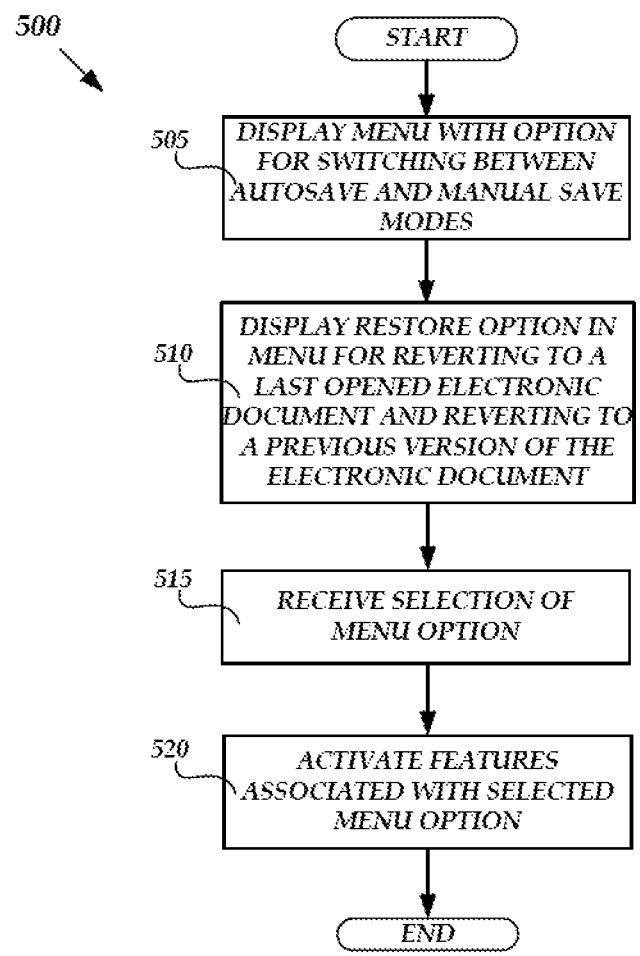
FIG. 5 is a flow diagram illustrating a routine for providing autosave and manual save modes for electronic documents, in accordance with an embodiment.

FIG. 5 is a flow diagram illustrating a routine 500 for providing autosave and manual save modes for electronic documents, in accordance with an embodiment. When reading the discussion of the routine presented herein, it should be appreciated that the logical operations of various embodiments of the present invention are implemented (1) as a sequence of computer implemented acts or program modules running on a computing device or system, and/or (2) as interconnected machine logical circuits or circuit modules within the computing device or system. The implementation is a matter of choice dependent on the performance requirements of the computing device or system implementing the invention. Accordingly, the logical operations illustrated in FIGS. 5-6 and making up the various embodiments described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present invention as recited within the claims set forth herein.

The routine 500 begins at operation 505, where an application executing on a computing device displays a menu (e.g., the menu 40 shown in FIGS. 1-4) in an application user interface displaying an electronic document. The menu may include the display of an option, which may be selected by a user, for switching between autosave and manual save modes for saving the electronic document. In accordance with an embodiment, the application, in displaying the menu option, may display a slider control which may be utilized to switch between the autosave and manual save modes. Other types of user interface controls may also be utilized.

From operation 505, the routine 500 continues to operation 510, where the application executing on the computing device may further display a restore option in the application user interface which may be utilized to revert to a last opened electronic document and revert to a previous version of the electronic document. In accordance with an embodiment and as shown in FIG. 3, the restore option may be displayed in the menu (discussed above at operation 505) and upon selection by a user, the application may further display additional options in the user interface for reverting to earlier document versions and reverting to previous document versions.

From operation 510, the routine 500 continues to operation 515, where the application executing on the computing device may receive a selection of one of the menu options (discussed at operations 505 and 510) in the application user interface. As discussed above, the menu options may be selected in any of a number of input methods including, but not limited to, touch, pointing device and voice input.

From operation 515, the routine 500 continues to operation 520, where the application executing on the computing device may activate one or more features associated with the menu option selected at operation 515. Various unique features associated with autosave and manual save modes (including restore options) will be discussed in detail below with respect to FIG. 6. From operation 520, the routine 500 then ends.

Figure 6:
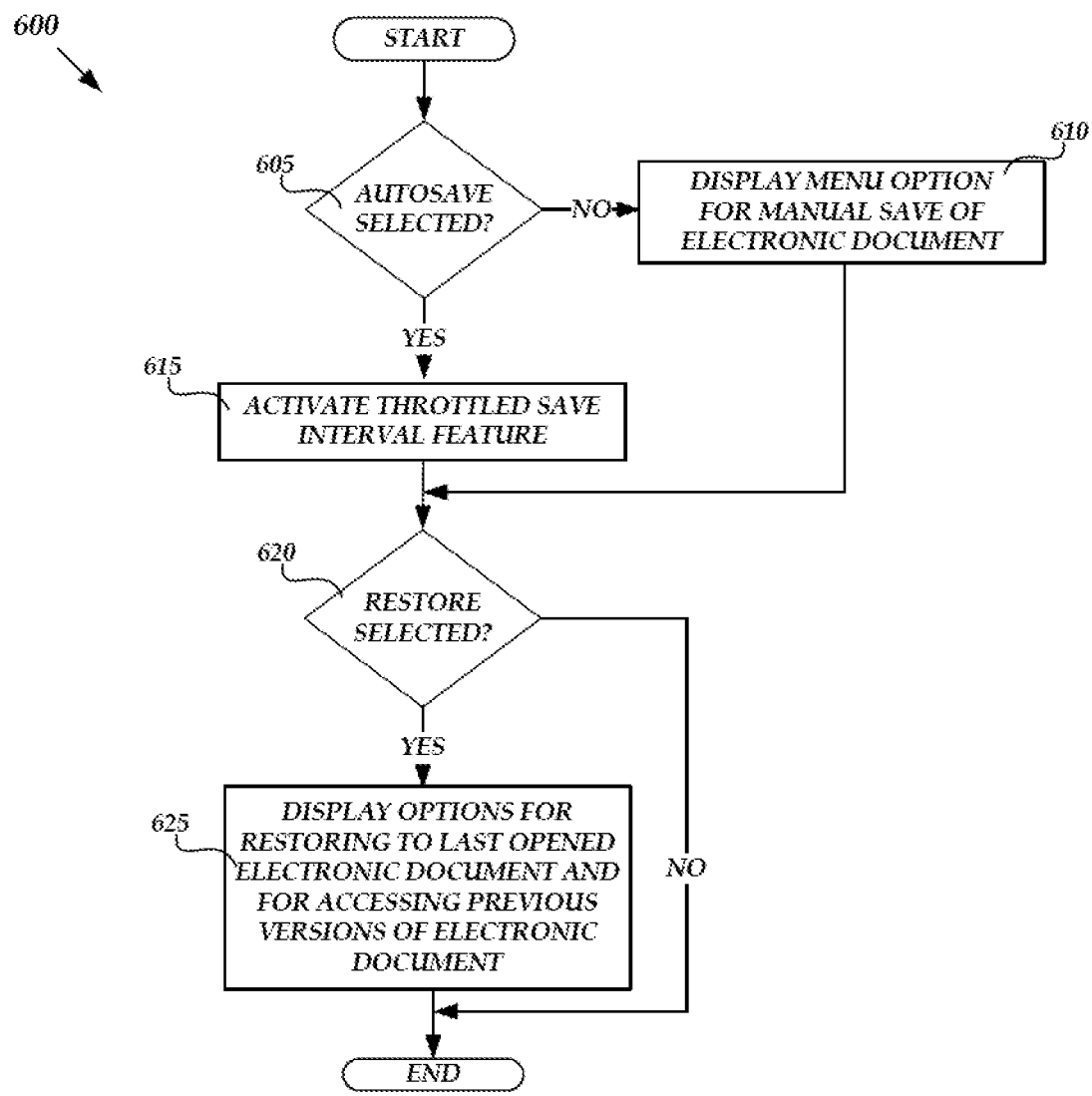
FIG. 6 is a flow diagram illustrating a routine for activating features associated with autosave and manual save modes for electronic documents, in accordance with an embodiment.

FIG. 6 is a flow diagram illustrating a routine 600 for activating features associated with autosave and manual save modes for electronic documents, in accordance with another embodiment. The routine 600 begins at operation 605, where an application executing on a computing device determines whether a menu option for autosave mode or manual save mode has been selected in an application user interface for the saving of an electronic document. As discussed above with respect to FIG. 1, the selection between autosave and manual save modes may be made by a user selecting a slider control in the application user interface. If, at operation 605, the application determines that an autosave mode has been selected (e.g., by sliding the slider control from "Off" to "On") then the operation 600 branches to operation 615. If, at operation 605, the application determines that a manual save mode has been selected (e.g., by sliding the slider control from "On" to "Off"), then the operation 600 continues to operation 610.

At operation 610, the application executing on the computing device may display a menu option for manually saving an electronic document in response to the selection of a manual save mode at operation 605. For example, as shown in FIG. 4, after receiving a selection of the manual save mode, the application may cause the display of a manual save control (e.g., "Save Now") which may be selected by a user to manually save an electronic document currently being displayed in the application user interface. From operation 610, the routine continues to operation 620.

At operation 615, the application executing on the computing device may activate a throttled save interval feature for saving an electronic document when the autosave mode is selected. In particular, the throttled save interval feature may function to alter automatic save intervals for electronic documents, thereby limiting user disruption. Thus, shorter automatic save intervals may be employed for electronic documents that save quickly (i.e., smaller files) and longer automatic save intervals may employed for electronic documents that save less quickly (i.e., larger files). For example, a one minute default interval may be determined for file saves under 0.5 seconds, a 1.5 minute save interval may be determined for file saves under one second, a three minute save interval may be determined for file saves under two seconds, a four minute save interval may be determined for saves under three seconds and a five minute save interval may be determined for saves under four seconds. It should be understood that the aforementioned save intervals are described for example purposes only and other save intervals may also be utilized. In accordance with an embodiment, the activation of the throttled save interval feature may include the following operations: (1) determine an estimated default save interval based on a file size associated with the electronic document; (2) monitor an actual save interval during one or more saves of the electronic document; (3) adjust the estimated default save interval for subsequent saves of the electronic document based on the monitored actual save interval; (4) display a progress indicator in the application user interface when a duration of the throttled save interval is longer than a predetermined time period (otherwise, the progress indicator is not displayed); (5) determine the non-occurrence of a user action associated with the application for a predetermined time period (e.g., no touch gesture being detected on the computing device for two seconds); (6) automatically save the electronic document in response to determining the non-occurrence of a user action (i.e., during any idle period associated with the application and/or after the aforementioned predetermined time period has expired); and (7) force an automatic save of the electronic document after determining an absence of a save operation for a predetermined length of time (e.g., if no save has occurred after five minutes, then a save of the electronic document is automatically initiated). It should be understood that in adjusting an estimated default save interval, the application executing on the computing device may determine that an actual monitored save interval is greater or less than an estimated default save interval and increase or decrease subsequent save intervals (based on file size) as appropriate. For example, if the application determines that the first save of a file estimated to take less than 0.5 seconds (and having an estimated default save interval of one minute) actually takes 0.9 seconds, then the application may increase subsequent save intervals from one minute to 1.5 minutes for that file. From operation 615, the routine 600 continues to operation 620.

At operation 620, the application executing on the computing device determines whether a menu option for restoring a previously saved electronic document has been selected in the application user interface for the saving of an electronic document. As discussed above with respect to FIG. 3, the selection of the restore option may be made by a user selecting the restore option 60 in the menu 40 of the application user interface 10. If, at operation 620, the application determines that the restore option has been selected, then the operation 600 continues to operation 625. Otherwise, the routine 600 then ends.

At operation 625, the application executing on the computing device may display options for restoring to a last opened electronic document and for accessing previous versions of the electronic document, in the application user interface. In particular (and as shown in FIG. 3), the application may be configured to display an option for replacing a current display of the electronic document with a display of a previously opened version of the electronic document in the application user interface and also display an option for accessing one or more previous versions of the electronic document. It should be understood that the one or more previous versions of the electronic document may be stored remotely from the computing device (i.e., on a remote data store). From operation 625, the routine 600 then ends.

Figure 7:
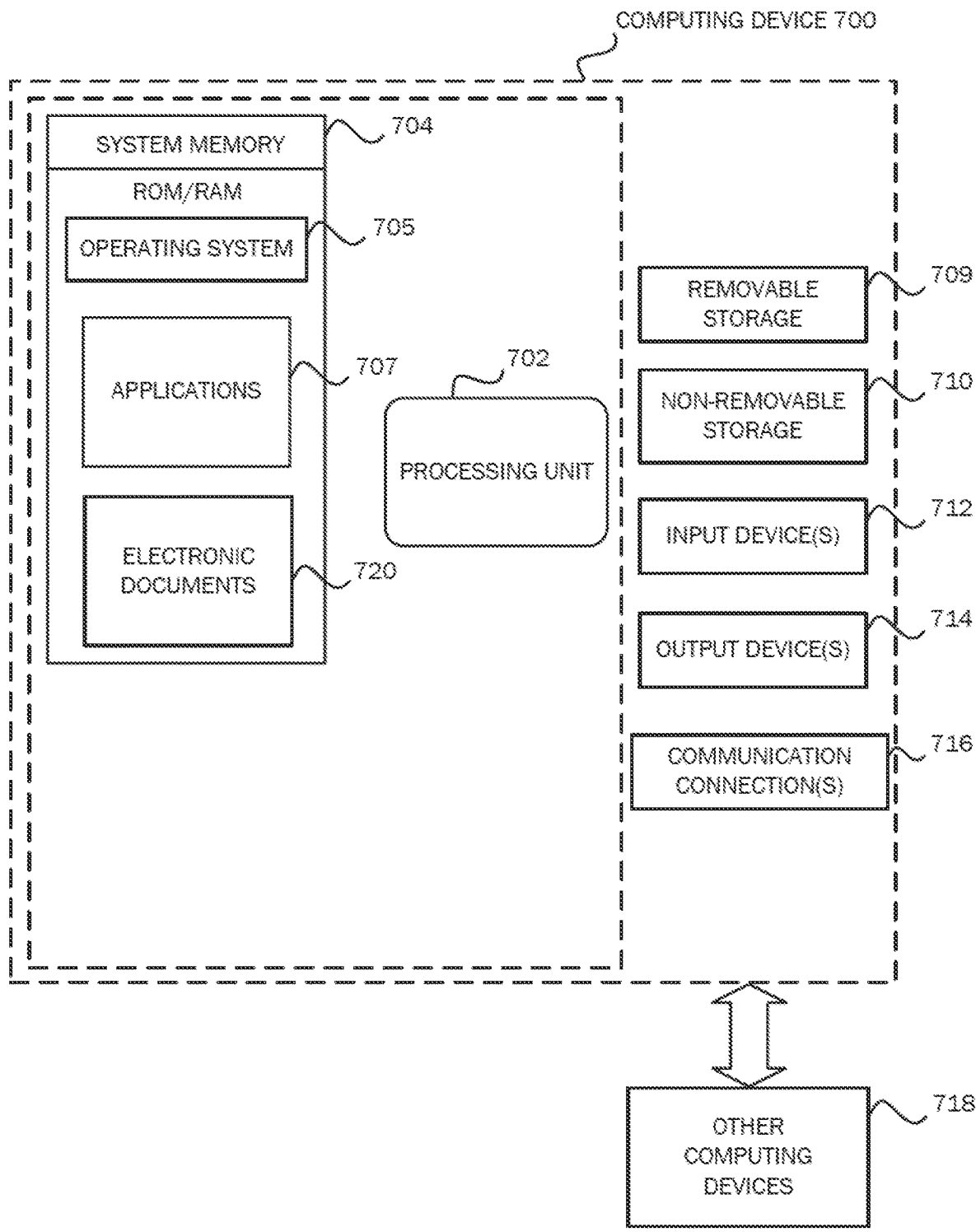
FIG. 7 is a simplified block diagram of a computing device with which various embodiments may be practiced.

FIG. 7 is a block diagram illustrating example physical components of a computing device 700 with which various embodiments may be practiced. In a basic configuration, the computing device 700 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination thereof. System memory 704 may include an operating system 705, applications 707 and electronic documents 720. Operating system 705, for example, may be suitable for controlling computing device 700's operation and, in accordance with an embodiment, may comprise the iOS and OS operating systems from APPLE INC. of Cupertino, Calif. and the WINDOWS operating systems from MICROSOFT CORPORATION of Redmond, Wash.

The applications 707 may be configured to provide autosave and manual save modes for the electronic documents 720. In accordance with an embodiment, the applications 707 may include, without limitation, productivity applications executing on a computing device. Illustrative productivity applications may include, but are not limited to, word processing software, presentation graphics software, spreadsheet software, diagramming software, project management software, publishing software, personal information management software and note-taking software. For example, in accordance with an embodiment, the applications 707 may comprise the WORD word processing software, POWERPOINT presentation graphics software, EXCEL spreadsheet software, VISIO diagramming software, PROJECT project management software, PUBLISHER publishing software, OUTLOOK personal information management software and the ONENOTE note-taking software from MICROSOFT CORPORATION of Redmond Wash. It should be appreciated that the aforementioned illustrative applications may comprise individual application programs or alternatively, may be incorporated into a suite of productivity applications such as the OFFICE application program suite from MICROSOFT CORPORATION. It should be understood that, in accordance with an alternative embodiment, the applications 707 may comprise a web browser for accessing various web-based applications online (e.g., via a remote server) over a computer network. It should be appreciated that the web-based applications may comprise, for example, online versions of the aforementioned productivity applications as well as other types of applications. It should be understood that the embodiments described herein may also be practiced in conjunction with other operating systems and application programs and further, is not limited to any particular application or system.

In accordance with an embodiment, the electronic documents 720 may comprise documents generated by or displayed in a user interface generated by the applications 707. For example, in accordance with various embodiments, the electronic documents 720 may include, without limitation, word processing documents, presentation documents, spreadsheet documents, diagramming documents, project management documents, publishing documents, personal information management documents and note-taking documents. It should be appreciated that the electronic documents 720 may be stored by the computing device 700 and/or stored on a remote data store accessible by the applications 707.

The computing device 700 may have additional features or functionality. For example, the computing device 700 may also include additional data storage devices (removable and/or non-removable) such as, for example, magnetic disks, optical disks, solid state storage devices ("SSD"), flash memory or tape. Such additional storage is illustrated in FIG. 7 by a removable storage 709 and a non-removable storage 710.

Generally, consistent with various embodiments, program modules may be provided which include routines, programs, components, data structures, and other types of structures that may perform particular tasks or that may implement particular abstract data types. Moreover, various embodiments may be practiced with other computer system configurations, including hand-held devices, multiprocessor systems, microprocessor-based or programmable consumer electronics, minicomputers, mainframe computers, and the like. Various embodiments may also be practiced in distributed computing environments where tasks are performed by remote processing devices that are linked through a communications network. In a distributed computing environment, program modules may be located in both local and remote memory storage devices.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 700 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Various embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include non-transitory and transitory, volatile and non-volatile, removable and non-removable media implemented in any method or technology for storage of information, such as computer readable instructions, data structures, program modules, or other data. The system memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 700. Any such computer storage media may be part of the computing device 700.

The computing device 700 may also have input device(s) 712 such as a keyboard, a mouse, a pen, a sound input device (e.g., a microphone) for receiving a voice input, a touch input device for receiving gestures, etc. Output device(s) 714 such as a display, speakers, a printer, etc. may also be included. Further, the computing device 700 may include communication connections 716 and may be coupled to other computing devices 718. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
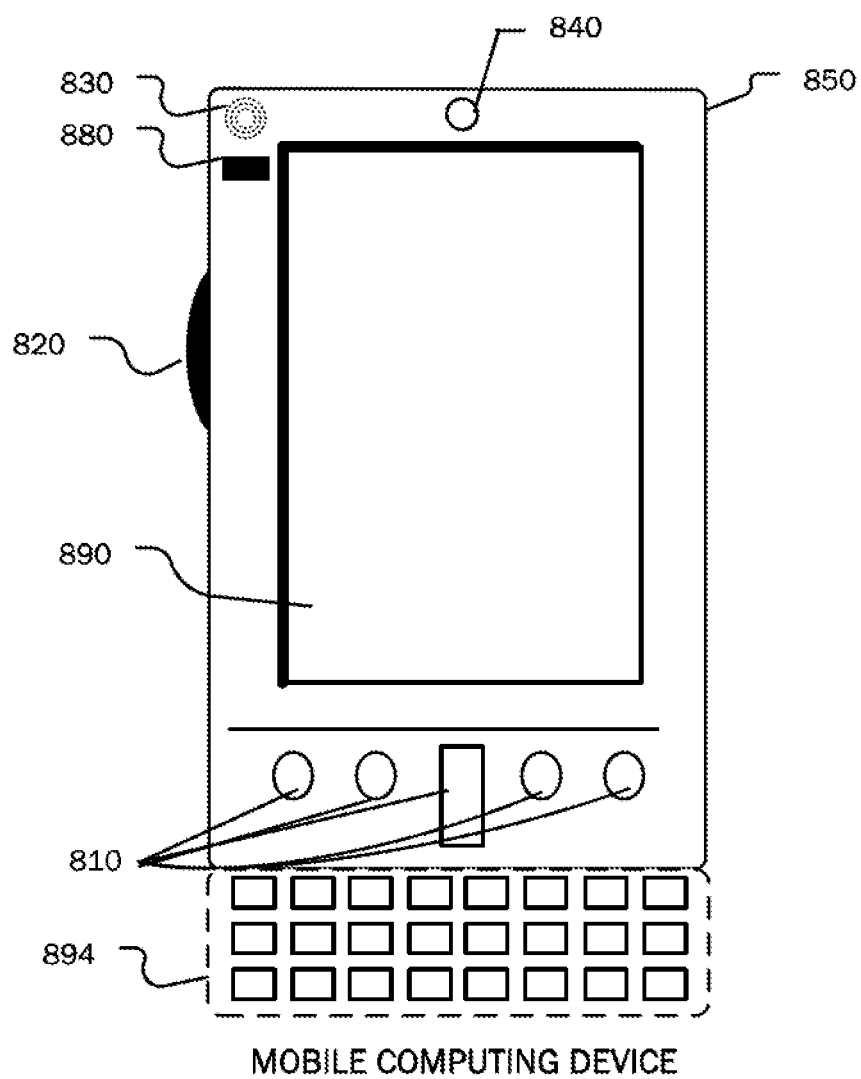
FIG. 8A is a simplified block diagram of a mobile computing device with which various embodiments may be practiced.
Figure 8B:
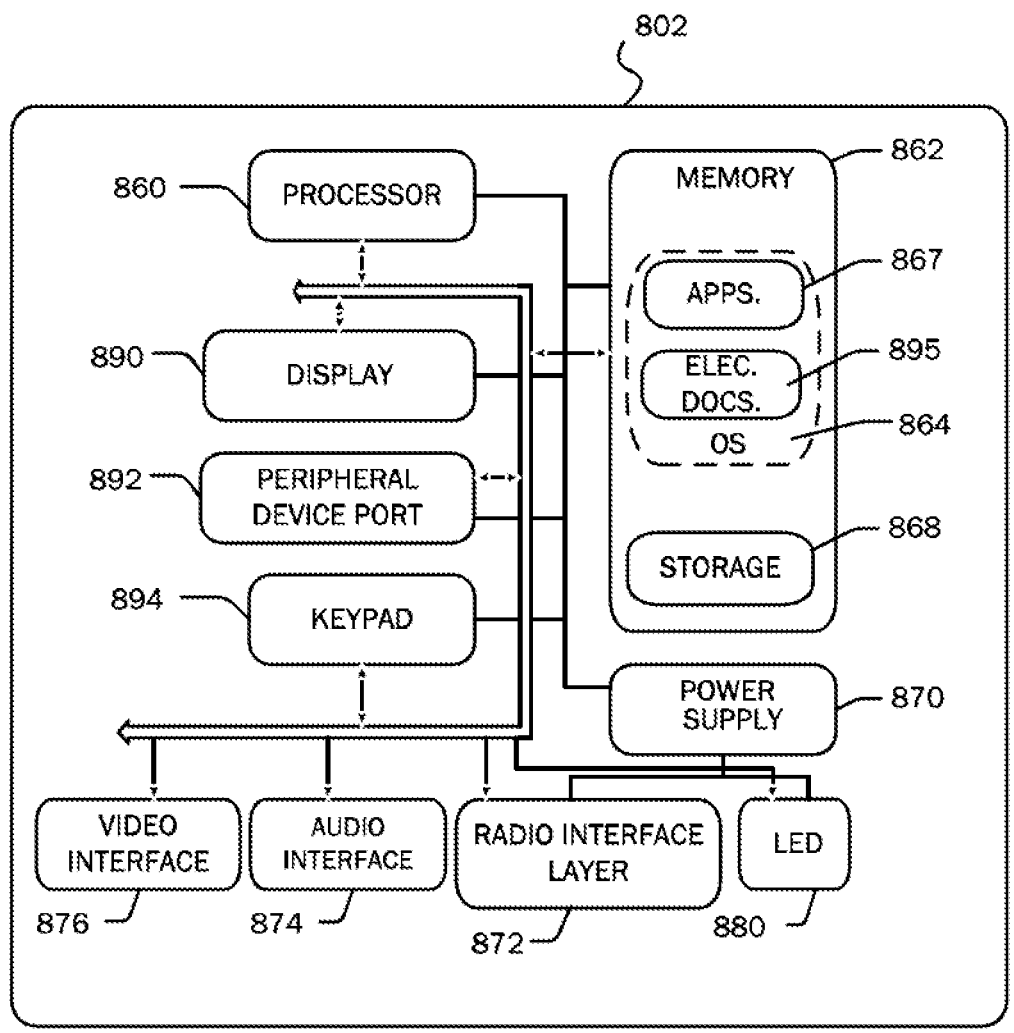
FIG. 8B is a simplified block diagram of a mobile computing device with which various embodiments may be practiced.

FIGS. 8A and 8B illustrate a suitable mobile computing environment, for example, a mobile computing device 850 which may include, without limitation, a smartphone, a tablet personal computer, a laptop computer, and the like, with which various embodiments may be practiced. With reference to FIG. 8A, an example mobile computing device 850 for implementing the embodiments is illustrated. In a basic configuration, mobile computing device 850 is a handheld computer having both input elements and output elements. Input elements may include touch screen display 840 and input buttons 810 that allow the user to enter information into mobile computing device 850. Mobile computing device 850 may also incorporate an optional side input element 820 allowing further user input. Optional side input element 820 may be a rotary switch, a button, or any other type of manual input element. In alternative embodiments, mobile computing device 850 may incorporate more or less input elements. For example, display 840 may not be a touch screen in some embodiments. In yet another alternative embodiment, the mobile computing device is a portable telephone system, such as a cellular phone having display 840 and input buttons 810. Mobile computing device 850 may also include an optional keypad 894. Optional keypad 894 may be a physical keypad or a "soft" keypad generated on the touch screen display.

Mobile computing device 850 incorporates output elements, such as display 840, which can display a graphical user interface (GUI). Other output elements include speaker 830 and LED 880. Additionally, mobile computing device 850 may incorporate a vibration module (not shown), which causes mobile computing device 850 to vibrate to notify the user of an event. In yet another embodiment, mobile computing device 850 may incorporate a headphone jack (not shown) for providing another means of providing output signals.

Although described herein in combination with mobile computing device 850, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 8B is a block diagram illustrating components of a mobile computing device used in one embodiment, such as the mobile computing device 850 shown in FIG. 8A. That is, mobile computing device 850 can incorporate a system 802 to implement some embodiments. For example, system 802 can be used in implementing a "smart phone" or tablet computer that can run one or more applications similar to those of a desktop or notebook computer. In some embodiments, the system 802 is integrated as a computing device, such as an integrated personal digital assistant (PDA), tablet computer and wireless phone.

Applications 867 and electronic documents 895 may be loaded into memory 862 and run on or in association with an operating system 864. The system 802 also includes display 890, peripheral device port 892, keypad 894 and non-volatile storage 868 within the memory 862. Non-volatile storage 868 may be used to store persistent information that should not be lost if system 802 is powered down. The applications 867 may use and store information in the non-volatile storage 868 and further be configured to provide autosave and manual save modes for the electronic documents 895. It should be appreciated that the applications 867 may comprise any of the illustrative applications discussed above with respect to FIG. 7.

A synchronization application (not shown) also resides on system 802 and is programmed to interact with a corresponding synchronization application resident on a host computer to keep the information stored in the non-volatile storage 868 synchronized with corresponding information stored at the host computer. As should be appreciated, other applications may also be loaded into the memory 862 and run on the mobile computing device 850.

The system 802 has a power supply 870, which may be implemented as one or more batteries. The power supply 870 might further include an external power source, such as an AC adapter or a powered docking cradle that supplements or recharges the batteries.

The system 802 may also include a radio 872 (i.e., radio interface layer) that performs the function of transmitting and receiving radio frequency communications. The radio 872 facilitates wireless connectivity between the system 802 and the "outside world," via a communications carrier or service provider. Transmissions to and from the radio 872 are conducted under control of OS 864. In other words, communications received by the radio 872 may be disseminated to the applications 867 via OS 864, and vice versa.

The radio 872 allows the system 802 to communicate with other computing devices, such as over a network. The radio 872 is one example of communication media. The embodiment of the system 802 is shown with two types of notification output devices: the LED 880 that can be used to provide visual notifications and an audio interface 874 that can be used with speaker 830 to provide audio notifications. These devices may be directly coupled to the power supply 870 so that when activated, they remain on for a duration dictated by the notification mechanism even though processor 860 and other components might shut down for conserving battery power. The LED 880 may be programmed to remain on indefinitely until the user takes action to indicate the powered-on status of the device. The audio interface 874 is used to provide audible signals to and receive audible signals from the user. For example, in addition to being coupled to speaker 830, the audio interface 874 may also be coupled to a microphone (not shown) to receive audible input, such as to facilitate a telephone conversation. In accordance with embodiments, the microphone may also serve as an audio sensor to facilitate control of notifications. The system 802 may further include a video interface 876 that enables an operation of on-board camera 840 to record still images, video streams, and the like.

A mobile computing device implementing the system 802 may have additional features or functionality. For example, the device may also include additional data storage devices (removable and/or non-removable) such as, magnetic disks, optical disks, or tape. Such additional storage is illustrated in FIG. 8B by storage 868.

Data/information generated or captured by the mobile computing device 850 and stored via the system 802 may be stored locally on the mobile computing device 850, as described above, or the data may be stored on any number of storage media that may be accessed by the device via the radio 872 or via a wired connection between the mobile computing device 850 and a separate computing device associated with the mobile computing device 850, for example, a server computer in a distributed computing network such as the Internet. As should be appreciated such data/information may be accessed via the mobile computing device 850 via the radio 872 or via a distributed computing network. Similarly, such data/information may be readily transferred between computing devices for storage and use according to well-known data/information transfer and storage means, including electronic mail and collaborative data/information sharing systems.

Figure 9:
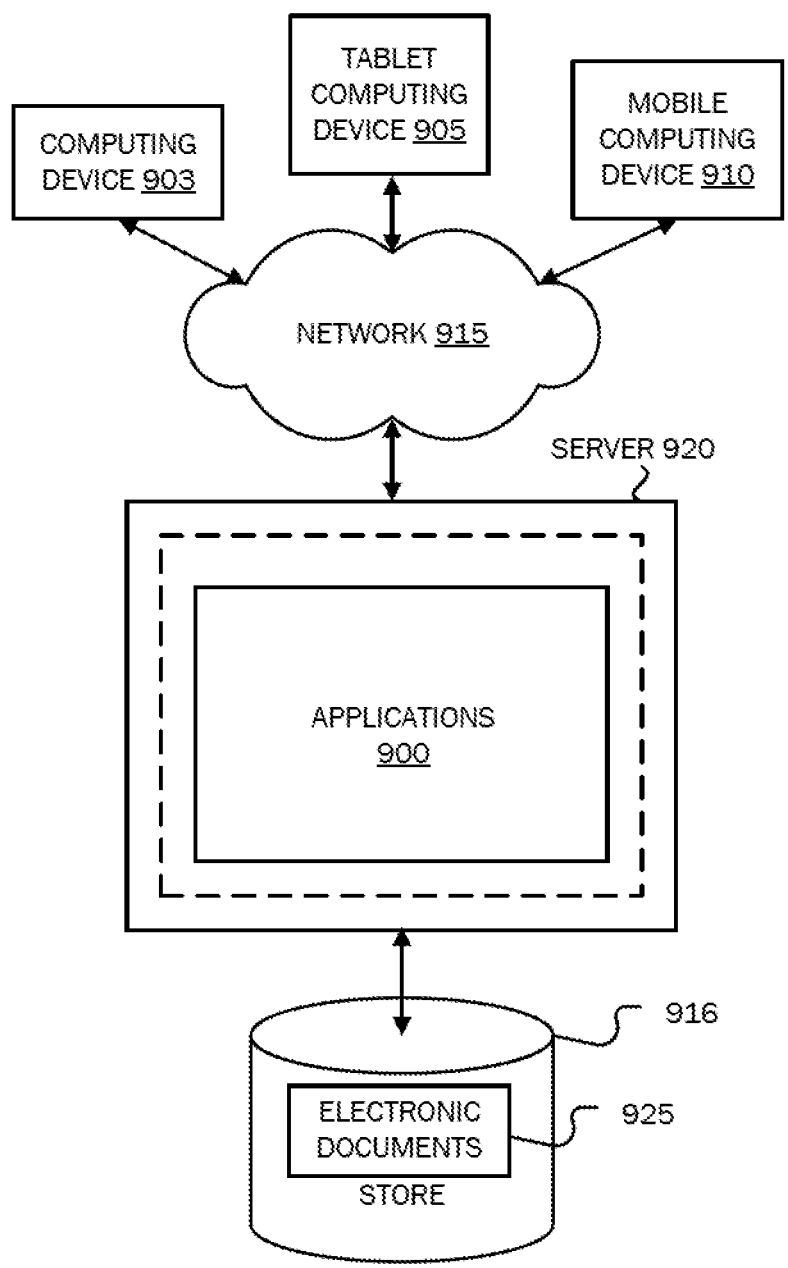
FIG. 9 is a simplified block diagram of a distributed computing system in which various embodiments may be practiced.

FIG. 9 is a simplified block diagram of a distributed computing system in which various embodiments may be practiced. The distributed computing system may include number of client devices such as a computing device 903, a table computing device 905 and a mobile computing device 910. The client devices 903, 905 and 910 may be in communication with a distributed computing network 915 (e.g., the Internet). A server 920 is in communication with the client devices 903, 905 and 910 over the network 915. The server 920 may store applications 900 which may be configured to provide autosave and manual save modes for the electronic documents 895. It should be appreciated that the applications 900 may comprise any of the illustrative applications discussed above with respect to FIG. 7. The applications 900 on the server 920 may be utilized by the client devices 903, 905 and 910 (over the network 915) to generate electronic documents 925 and for storing same in a store 916.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routines' operations may be modified in any manner, including by reordering operations and/or inserting or operations, without departing from the embodiments described herein.

It will be apparent to those skilled in the art that various modifications or variations may be made without departing from the scope or spirit of the embodiments described herein. Other embodiments will be apparent to those skilled in the art from consideration of the specification and practice of the embodiments described herein.

What is claimed is:

1. A computer-implemented method comprising:
   activating an autosave mode of an application, with a user input via a user interface presented on a display screen of a computing device; and
   editing an electronic document in the autosave mode including:
      configuring at least one throttled save interval for saving the electronic document, the at least one throttled save interval including an initial throttled save interval;
      establishing the initial throttled save interval based on a file size associated with the electronic document, the initial throttled save interval comprising an amount of time expended between an automatic save of the electronic document and next one or more of automatic saves of the electronic document;
      monitoring an amount of time expended during the next one or more of automatic saves of the electronic document;
      automatically adjusting the initial throttled save interval for subsequent saves of the electronic document by increasing or decreasing the initial throttled save interval based on monitored amount of time expended during the next one or more of automatic saves of the electronic document; and
      automatically saving the subsequent saves of the electronic document according to the increased or decreased initial throttled save interval.

2. The computer-implemented method of claim 1, further comprising receiving a user-input instruction to both exit the autosave mode and enter a manual save mode and, in response to receipt of the user-input instruction, stopping the at least one throttled save interval.

3. The computer-implemented method of claim 1, further comprising, activating the autosave mode based on a non-occurrence of a user interaction with the application for a predetermined period of time.

4. The computer-implemented method of claim 1, further comprising, displaying a document restore option in the user interface of the application, receiving a selection of the document restore option and, in response to receipt of the selection, replacing the display screen of the electronic document with a previous version of the electronic document.

5. The computer-implemented method of claim 1, wherein the application comprises a productivity application.

6. The computer-implemented method of claim 5, wherein the productivity application comprises a word processing application, a presentation graphics application, a spreadsheet application, a diagramming application, a project management application, a publishing application, a personal information management application, or a note-taking application.

7. The computer-implemented method of claim 5, further comprising displaying in the user interface of the application a selectable on/off switch, wherein a selection of "on" provides an indication to activate the autosave mode and a selection of "off" provides an indication to activate a manual save mode in place of the autosave mode.

8. A computing device comprising:
a memory storing computer executable instructions; and
a processor, wherein the processor executes the computer executable instructions and is caused to:
activate an autosave mode of an application, with a user input via a user interface presented on a display screen of the computing device; and
edit an electronic document in the autosave mode including:
configuring at least one throttled save interval for saving the electronic document, the at least one throttled save interval including an initial throttled save interval;
establishing the initial throttled save interval based on a file size associated with the electronic document, the initial throttled save interval comprising an amount of time expended between an automatic save of the electronic document and next one or more of automatic saves of the electronic document;
monitoring an amount of time expended during the next one or more of automatic saves of the electronic document;
automatically adjusting the initial throttled save interval for subsequent saves of the electronic document by increasing or decreasing the initial throttled save interval based on monitored amount of time expended during the next one or more of automatic saves of the electronic document; and
automatically saving the subsequent saves of the electronic document according to the increased or decreased initial throttled save interval.

9. The computing device of claim 8, wherein the processor is further caused to receive a user-input instruction to both exit the autosave mode and enter a manual save mode and, in response to receipt of the user-input instruction, stop the at least one throttled save interval.

10. The computing device of claim 8, wherein the processor is further caused to activate the autosave mode based on a non-occurrence of a user interaction with the application for a predetermined period of time.

11. The computing device of claim 8, wherein the processor is further caused to display on the display screen of the computing device a document restore option in the user interface of the application, receive a selection of the document restore option and, in response to receipt of the selection, replace the display screen of the electronic document on the computing device with a previous version of the electronic document.

12. The computing device of claim 8, wherein the application comprises a productivity application.

13. The computing device of claim 12, wherein the productivity application comprises a word processing application, a presentation graphics application, a spreadsheet application, a diagramming application, a project management application, a publishing application, a personal information management application, or a note-taking application.

14. The computing device of claim 12, wherein the processor is further caused to display on the display screen of the computing device, a selectable on/off switch in the user interface of the application, wherein a selection of "on" provides an indication to activate the autosave mode and a selection of "off" provides an indication to activate a manual save mode in place of the autosave mode.

15. Non-transitory computer storage media storing processor-executable instructions, when used by one or more computing devices, cause the one or more computing devices to:
activate an autosave mode of an application, with a user input via a user interface presented on a display screen of a computing device of the one or more computing devices; and
edit an electronic document in the autosave mode including:
configuring at least one throttled save interval for saving the electronic document, the at least one throttled save interval including an initial throttled save interval;
establishing the initial throttled save interval based on a file size associated with the electronic document, the initial throttled save interval comprising an amount of time expended between an automatic save of the electronic document and next one or more of automatic saves of the electronic document;
monitoring an amount of time expended during the next one or more of automatic saves of the electronic document;
automatically adjusting the initial throttled save interval for subsequent saves of the electronic document by increasing or decreasing the initial throttled save interval based on monitored amount of time expended during the next one or more of automatic saves of the electronic document; and
automatically saving the subsequent saves of the electronic document according to the increased or decreased initial throttled save interval.

16. The non-transitory computer storage media of claim 15, wherein the processor-executable instructions, when used by the one or more computing devices, further cause the one or more computing devices to receive a user-input instruction to both exit the autosave mode and enter a manual save mode and, in response to receipt of the user-input instruction, stop the at least one throttled save interval.

17. The non-transitory computer storage media of claim 15, wherein the processor-executable instructions, when used by the one or more computing devices, further cause the one or more computing devices to activate the autosave mode based on a non-occurrence of a user interaction with the application for a predetermined period of time.

18. The non-transitory computer storage media of claim 15, wherein the processor-executable instructions, when used by the one or more computing devices, further cause the one or more computing devices to display on the display screen of the computing device a document restore option in the user interface of the application, receive a selection of the document restore option and, in response to receipt of the selection, replace the display screen of the electronic document on the computing device with a previous version of the electronic document.

19. The non-transitory computer storage media of claim 15, wherein the application comprises a productivity application and where the productivity application comprises a word processing application, a presentation graphics application, a spreadsheet application, a diagramming application, a project management application, a publishing application, a personal information management application, or a note-taking application.

20. The non-transitory computer storage media of claim 15, wherein the processor-executable instructions, when used by the one or more computing devices, further cause the one or more computing devices to display on the display screen of the computing device, a selectable on/off switch in the user interface of the application, wherein a selection of "on" provides an indication to activate the autosave mode and a selection of "off" provides an indication to activate a manual save mode in place of the autosave mode.

\* \* \* \* \*